US012726264B2

(12) United States Patent
Lin et al.

(10) Patent No.: US 12,726,264 B2
(45) Date of Patent: Sep. 1, 2026

(54) METHOD AND APPARATUS FOR SATELLITE ACCESS NETWORK MEASUREMENT AND DATA SCHEDULING

(71) Applicant: MediaTek Inc., Hsinchu City (TW)

(72) Inventors: Hsuan-Li Lin, Hsinchu City (TW); Abdelkader Medles, Cambridge (GB)

(73) Assignee: MediaTek Inc., Hsinchu City (TW)

( * ) Notice: Subject to any disclaimer, the term of this patent is extended or adjusted under 35 U.S.C. 154(b) by 600 days.

(21) Appl. No.: 18/077,207

(22) Filed: Dec. 7, 2022

(65) Prior Publication Data

US 2023/0224026 A1 Jul. 13, 2023

Related U.S. Application Data

(60) Provisional application No. 63/297,841, filed on Jan. 10, 2022.

(51) Int. Cl.

*H04B 7/185* (2006.01)
*H04L 5/00* (2006.01)
*H04W 24/10* (2009.01)

(52) U.S. Cl.

CPC ....... *H04B 7/18519* (2013.01); *H04L 5/0048* (2013.01); *H04W 24/10* (2013.01)

(58) Field of Classification Search

CPC .... H04B 7/185; H04B 7/1851; H04B 7/1859; H04L 5/003; H04L 5/0048; H04L 5/0069; H04W 72/12; H04W 72/121; H04W 72/1263–1273; H04W 24/02; H04W 24/10

See application file for complete search history.

(56) References Cited

U.S. PATENT DOCUMENTS

2019/0052379 A1 2/2019 Lin et al.
2019/0059093 A1* 2/2019 Cheng .................. H04L 5/0082
2021/0273719 A1 9/2021 Wang et al.
2022/0225132 A1* 7/2022 Roy ...................... H04W 24/08
(Continued)

FOREIGN PATENT DOCUMENTS

CN 112312451 A 2/2021
CN 113300802 A 8/2021
(Continued)

OTHER PUBLICATIONS

3GPP, "Solutions for NR to support non-terrestrial networks (NTN)", May 2021, 3GPP TR 38.821 V16.1.0, pp. 1-140 (Year: 2021).*
(Continued)

*Primary Examiner* — Paul H. Masur
(74) *Attorney, Agent, or Firm* — Andy M. Han; Han IP PLLC

(57) ABSTRACT

Various solutions for satellite access network (SAN) or non-terrestrial network (NTN) measurement and data scheduling with respect to user equipment and network apparatus in mobile communications are described. An apparatus may determine whether to perform a measurement outside a measurement gap for a neighboring cell. The apparatus may apply a scheduling restriction within a time period in an event that the measurement is determined. The apparatus may transmit uplink symbols or receiving downlink symbols outside the time period with the scheduling restriction.

20 Claims, 6 Drawing Sheets

DATA INTERRUPTION ALLOWED

SYMBOLS OF SERVING CELL 0 1 2 3 4 5 6 7 8 9 10 11 12 13

SYMBOLS CAN BE SCHEDULED (WITH SCHEDULING AVAILABILITY)

SSB SYMBOLS FROM NEIGHBORING CELL/SATELLITES

SYMBOLS CAN BE SCHEDULED (WITH SCHEDULING AVAILABILITY)

(56) References Cited

U.S. PATENT DOCUMENTS

| | | | | |
|---|---|---|---|---|
| 2022/0232498 | A1* | 7/2022 | Muhammad | H04W 36/0085 |
| 2023/0046505 | A1* | 2/2023 | Hu | H04W 24/10 |
| 2023/0224748 | A1* | 7/2023 | Park | H04W 24/02<br>370/329 |
| 2024/0080092 | A1* | 3/2024 | Sedin | H04L 5/0051 |
| 2024/0163051 | A1* | 5/2024 | Cui | H04L 5/0048 |
| 2025/0016592 | A1* | 1/2025 | Rune | H04B 7/18545 |
| 2025/0048288 | A1* | 2/2025 | Xiong | H04W 56/0015 |
| 2025/0071587 | A1* | 2/2025 | Kim | H04B 17/318 |

FOREIGN PATENT DOCUMENTS

| | | | |
|---|---|---|---|
| CN | 113644949 | A | 11/2021 |
| WO | WO 2019245199 | A1 | 12/2019 |
| WO | WO 2021037645 | A1 | 3/2021 |
| WO | WO 2021159847 | A1 | 8/2021 |
| WO | WO 2021179181 | A1 | 9/2021 |
| WO | WO 2021207901 | A1 | 10/2021 |
| WO | WO-2023068990 | A1 * | 4/2023 |

OTHER PUBLICATIONS

Qualcomm, "SMTC and MG enhancements", Nov. 1-12, 2021, 3GPP TSG-RAN WG2 Meeting #116e, R2-2109972, pp. 1-4 ( Year: 2021).*

Ericsson, "Remaining Issues on SMTC and measurement Gap configuration for NTN", Nov. 1-12, 2021, 3GPP TSG-RAN WG2 #116e, R2-2111166, pp. 1-4 (Year: 2021).*

Apple, "Discussion on measurement procedure requirements for NTN", Nov. 1-12, 2021, 3GPP TSG-RAN4 Meeting #101-e, R4-2117456, pp. 1-6 (Year: 2021).*

Taiwan Intellectual Property Office, Office Action in Taiwan Patent Application No. 112100295, May 31, 2023.

European Patent Office, Extended European Search Report in European Patent Application 23150270.9, Jun. 2, 2023.

China National Intellectual Property Administration, 1st Office Action in China Application No. 202310014138.6, May 30, 2025.

* cited by examiner

METHOD AND APPARATUS FOR SATELLITE ACCESS NETWORK MEASUREMENT AND DATA SCHEDULING

CROSS REFERENCE TO RELATED PATENT APPLICATION(S)

The present disclosure claims the priority benefit of U.S. Provisional Patent Application No. 63/297,841, filed on 10 Jan. 2022. The contents of aforementioned applications are herein incorporated by reference in their entirety.

TECHNICAL FIELD

The present disclosure is generally related to mobile communications and, more particularly, to satellite access network (SAN) or non-terrestrial network (NTN) measurement and data scheduling with respect to user equipment (UE) and network apparatus in mobile communications.

BACKGROUND

Unless otherwise indicated herein, approaches described in this section are not prior art to the claims listed below and are not admitted as prior art by inclusion in this section.

In mobile/wireless communications, more and more attentions and participation were drawn into satellite communications, with companies and organizations convinced of the market potential for an integrated satellite and terrestrial network infrastructure in the context of 3$^{rd}$ Generation Partnership Project (3GPP) 5G standards. Satellites refer to spaceborne vehicles in Low Earth Orbits (LEO), Medium Earth Orbits (MEO), Geostationary Earth Orbit (GEO) or in Highly Elliptical Orbits (HEO). 5G standards make Non-Terrestrial Networks (NTN), including satellite segments, a recognized part of 3GPP 5G connectivity infrastructure. A low earth orbit is an earth-centered orbit with an altitude of 2,000 km or less, or with a period of 128 minutes or less (i.e., making at least 11.25 orbits per day) and an eccentricity less than 0.25. Most of the artificial objects in outer space are in non-geostationary satellite orbit (NGSO) (e.g., LEO or MEO), with an altitude never more than about one-third of the radius of Earth. NGSO satellites orbit around the earth at a high speed (mobility), but over a predictable or deterministic orbit.

One of the challenges in NGSO communications is that the Doppler shift is huge since the NGSO satellites move at a high speed. The Doppler shift of a LEO-600 km network can be up to 24 parts per million (ppm). For example, in the 2 gigahertz (GHz) carrier, the maximum Doppler shift of a LEO satellite can be up to +/−48 kilohertz (kHz). Therefore, satellite/cell measurements in NGSO satellite-based NTN can be quite different from terrestrial networks. In terrestrial networks, cells/base stations are well synchronized in frequency and the Doppler shifts among cells/base stations are minor. No need to consider Doppler effect when performing measurements. However, in NTN or SAN, Doppler effect is significant and Doppler shifts among satellites/cells are large. This will cause additional burdens on the UE in processing frequency drifts when performing satellite/cell measurements. The capability/cost requirements including hardware and software for the UE will become more complex and expensive.

Accordingly, how to overcome large Doppler shifts becomes an important issue for satellite communications in the newly developed wireless communication network. Therefore, there is a need to provide proper schemes to perform satellite/cell measurements without increasing UE burdens and requirements.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to SAN or NTN measurement and data scheduling with respect to user equipment and network apparatus in mobile communications.

In one aspect, a method may involve an apparatus determining whether to perform a measurement outside a measurement gap for a neighboring cell. The method may also involve the apparatus applying a scheduling restriction within a time period in an event that the measurement is determined. The method may further involve the apparatus transmitting uplink symbols or receiving downlink symbols outside the time period with the scheduling restriction.

In one aspect, an apparatus may comprise a transceiver which, during operation, wirelessly communicates with at least one network node of a wireless network. The apparatus may also comprise a processor communicatively coupled to the transceiver. The processor, during operation, may perform operations comprising determining whether to perform a measurement outside a measurement gap for a neighboring cell. The processor may also perform operations comprising applying a scheduling restriction within a time period in an event that the measurement is determined. The processor may further perform operations comprising transmitting, via the transceiver, uplink symbols or receiving downlink symbols outside the time period with the scheduling restriction.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (I) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to SAN or NTN measurement and data scheduling with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
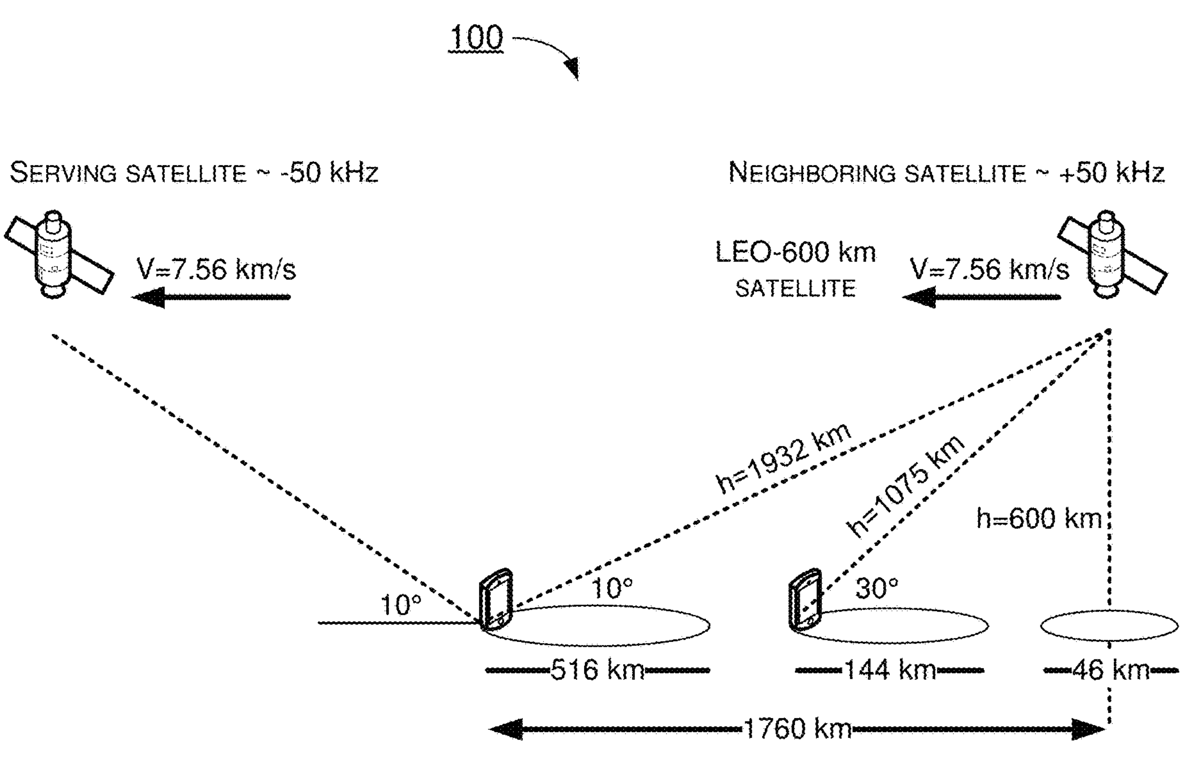
FIG. 1 is a diagram depicting an example scenario under schemes in accordance with implementations of the present disclosure.

According to the reference scenario parameters of Table 4.2-2 in 3GPP TR 38.821, the maximum Doppler shift of a LEO-600 km network can be up to 24 ppm. In addition, the Doppler of a serving satellite and a neighboring satellite may be with different signs (e.g., the serving satellite is leaving the UE while the neighboring cell is approaching to the UE). FIG. 1 illustrates an example scenario 100 under schemes in accordance with implementations of the present disclosure. Scenario 100 involves at least one UE and a plurality of network nodes (e.g., satellites), which may be a part of a wireless communication network (e.g., an LTE network, a 5G/NR network, an IoT network or a 6G network). As shown in FIG. 1, the satellites are deployed in LEO or NGSO and orbit around the earth at a high speed. The UE on the ground needs to connect to a serving satellite for SAN or NTN communications. The UE may also need to perform some measurements on a neighboring satellite for mobility management. Under scenario 100, the UE is located between two satellites. Thus, the serving satellite is leaving the UE and the neighboring cell is approaching to the UE. The Doppler shift will become large/significant under such situation. For example, the Doppler shift of the serving satellite observed at the UE could be −50 kHz whereas the Doppler shift of the neighboring satellite observed at the UE could be +50 kHz. It leads up to around 100 kHz frequency separation between the serving satellite and the neighboring satellite.

Figure 2:
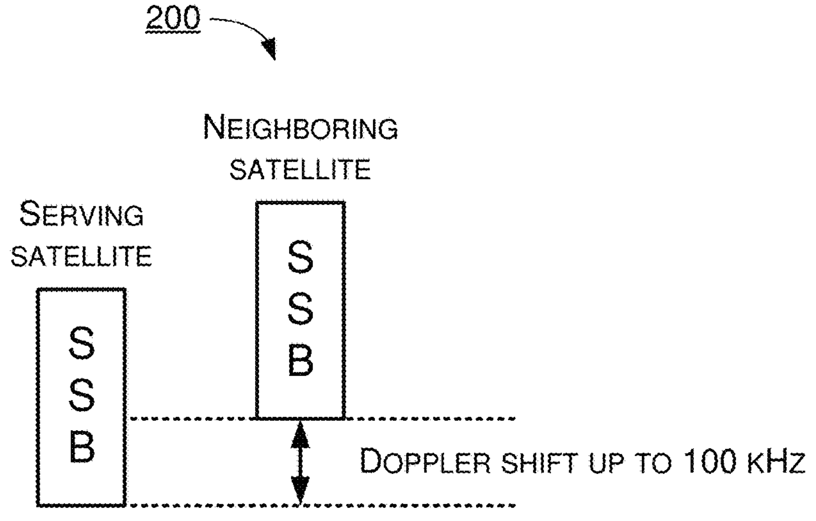
FIG. 2 is a diagram depicting an example scenario under schemes in accordance with implementations of the present disclosure.

FIG. 2 illustrates an example scenario 200 under schemes in accordance with implementations of the present disclosure. The Doppler shift between the reference signals (e.g., Synchronization Signal Block (SSB)) from the serving satellite and the neighboring satellite at 2 GHz can be up to 100 kHz. In other words, if two satellites are configured in one measurement object (MO) with the same absolute radio frequency channel number (ARFCN), up to 100 kHz Doppler shift can be observed. Therefore, extra hardware would be needed to receive/measure on different satellites. For example, the UE may need to be equipped with two transceivers to perform measurements on the neighboring satellite while connecting to the serving satellite. Additional hardware/software costs may be also needed for communicating with the two satellites at the same time.

In view of the above, the present disclosure proposes several schemes pertaining to measurements and data scheduling with respect to UE and network apparatus in SAN or NTN. According to the schemes of the present disclosure, some time-division multiplexing (TDM) manners may be introduced to resolve the aforementioned issues for perform serving cell data reception and neighboring cell measurement. The TDM manners may comprise using a measurement gap or a scheduling restriction/availability or allowing a data interruption. The scheduling restriction may be deemed as uplink (UL) transmission gap or downlink (DL) reception gap. In the UL transmission gap, the UE is not allowed or not expected to transmit UL symbols. In the DL reception gap, the UE is not allowed or not expected to receive DL symbols. The UE may apply the scheduling restriction within a given/determined time period for the serving cell/satellite. During the given/determined time period, the UE may be able to perform measurements for the neighboring cell/satellite. Thus, the UE does not need to perform data reception and measurement for different cells/satellites at the same time. The conflict among different cells/satellites may also be avoided. Accordingly, the UE is able to support NTN/SAN measurements on multiple cells/satellites (e.g., NGSO satellites) and mobility performance without significant increase in UE measurement resources (e.g., hardware/software resources). Some balances can be reached between data reception performance and UE design costs.

Generally, the UE may connect to a serving cell for data reception/transmission. The cell may comprise a satellite, a network node or a base station. The serving cell may configure some frequency bands/points (e.g., via radio resource control (RRC) configuration) for the UE to perform measurements for possible neighboring cells. For example, the serving cell may configure the UE to perform some intra-frequency measurements. In the terrestrial network, cells/base stations are well synchronized in frequency and the Doppler shifts among cells/base stations are minor. The UE doesn't need to change frequency bands of its transceiver for the measurements. Therefore, no measurement gaps are configured/defined for the measurements. The measurement gaps are based on network configurations on periodicity and duration. However, in SAN or NTN, since the Doppler shift is significant, the UE needs to switch/adjust frequency bands of its transceiver for the measurements. In view of that no measurement gaps are configured/defined for the measurements, the UE can apply the novel schemes proposed in the present disclosure for the measurements outside the measurement gaps.

Specifically, the UE may be configured to perform NTN or SAN neighboring (i.e., non-serving) cell measurements outside the measurement gaps. In other words, no measurement gaps are configured for the neighboring cell measurements. Thus, the UE may determine whether it needs to perform a measurement outside a measurement gap for a neighboring cell. Then, the UE needs to determine whether a cell for measurement is a neighboring cell. The UE may receive a first ephemeris of a serving cell and a second ephemeris of the neighboring cell. The ephemeris may carry some information for identifying the satellite. The UE may determine that the serving cell and the neighboring cell are served by different satellites according to the first ephemeris and the second ephemeris. For example, in a case that the first ephemeris and the second ephemeris are different, the UE can derive that it needs to perform the neighboring cell measurement.

In an event that the neighboring cell measurement outside the measurement gap is determined, a scheduling restriction may be applied or a data interruption may be allowed within a time period. The measurement may comprise at least one of an intra-frequency measurement and an inter-frequency measurement without measurement gap. During the time period, the UE does not (e.g., is not allowed/expected to) transmit and/or receive data on the orthogonal frequency division multiplexing (OFDM) symbols or slots/subframes with the scheduling restriction or during the allowed data interruption. The UE may cancel data transmission or data reception within the time period. The UE may not transmit uplink symbols or not receive downlink symbols within the time period with the scheduling restriction. On the other hand, the satellite/network node is not expected to schedule data (e.g., DL data or UL data) for the UE within the time period. The scheduling restriction may be some pre-defined rules for the UE and the network side. The UE and the network side may apply the scheduling restriction directly when a trigger condition is met.

Therefore, within the time period with the scheduling restriction or the allowed data interruption, the UE may be able to perform measurements for the neighboring cell. The UE may adjust its transceiver or radio frequency (RF) front-end to fit the frequency of the neighboring cell. The UE may perform the measurement in a first frequency band of the neighboring cell different from a second frequency band of a serving cell. Accordingly, the UE is able to perform neighboring cell measurements without increasing its hardware/software complexity/costs.

In some implementations, the time period may comprise a plurality of OFDM symbols, slots or subframes overlapped with a reference signal of the neighboring cell. The reference signal may comprise a Synchronization Signal Block (SSB), a Channel State Information-Reference Signal CSI-RS) or other reference signals for measurement. The time period may further comprise a pre-determined number of symbols before and after the reference signal. For example, the overall time period may comprise the reference signal and X symbols before and after the reference signal. The X symbols can be 0, 1, 2, . . . , etc. symbols. The X symbols are the additional margin for preparing measurements or adjusting RF transceiver by the UE. In some implementations, the time period may comprise an SSB-based radio resource management (RRM) measurement timing configuration (SMTC) window associated to the neighboring cell. Similarly, the time period may further comprise X symbols before and after the SMTC window.

Symbols or slots/subframes without the scheduling restriction (i.e., with scheduling availability) can be scheduled to the UE. The UE may transmit UL symbols or receive DL symbols outside the time period with the scheduling restriction. In other words, the UE may transmit UL symbols or receive DL symbols on the symbols with scheduling availability. On the other hand, the satellite/network node is allowed to schedule data (e.g., DL data or UL data) for the UE outside the time period with the scheduling restriction.

Figure 3:
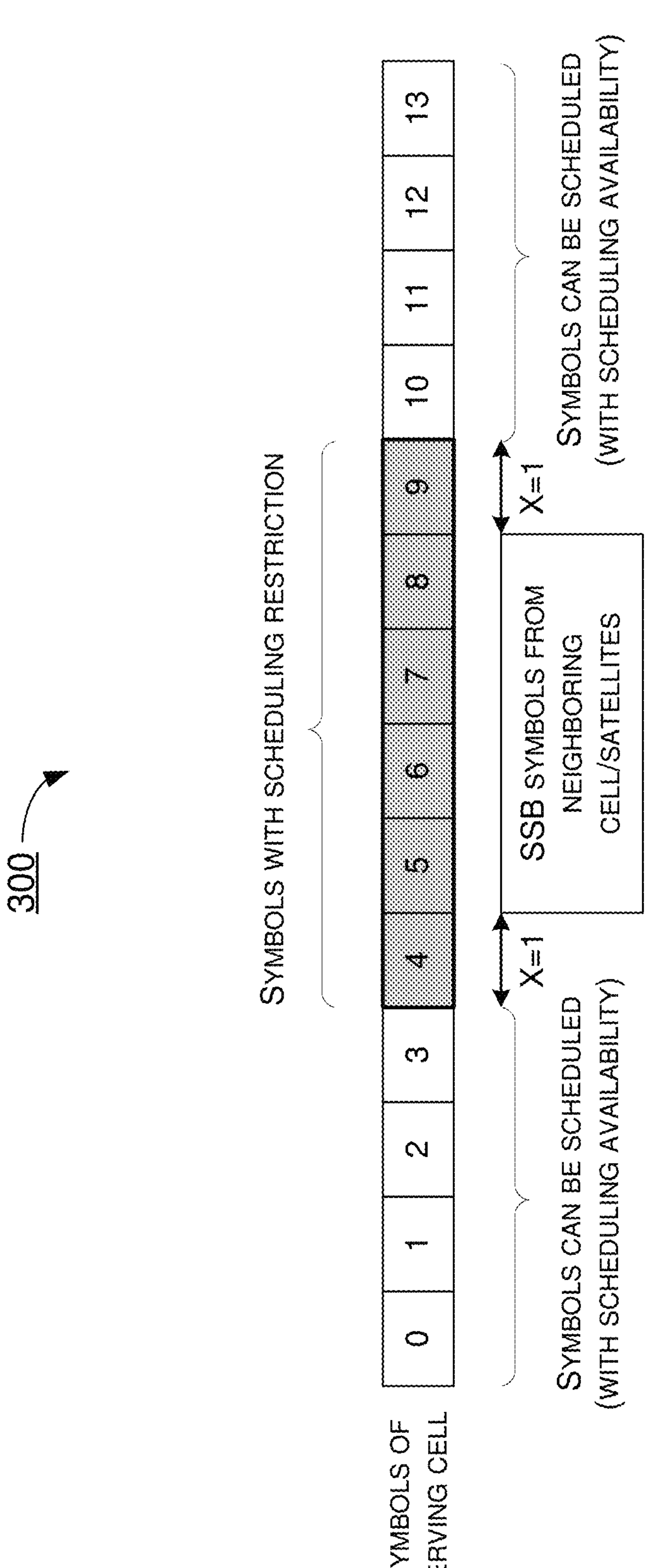
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves at least one UE and a plurality of network nodes (e.g., satellites), which may be a part of a wireless communication network (e.g., an LTE network, a 5G/NR network, an IoT network or a 6G network). The satellites are deployed in LEO and orbit around the earth at a high speed. The UE on the ground connects to a serving satellite for SAN or NTN communications. The UE needs to perform measurements on a neighboring satellite for mobility management. At first, the UE may receive a first ephemeris of the serving satellite and a second ephemeris of the neighboring satellite. The UE may further receive a measurement gap configuration from the serving satellite if any. Then, the UE needs to determine whether to perform a measurement outside the measurement gap for the neighboring satellite by determining whether the serving satellite and the neighboring satellite are different satellites and no measurement gap is configured for the measurement. The neighboring satellite measurement may be an intra-frequency measurement and an inter-frequency measurement without measurement gap.

Once the UE determines that it needs to perform the neighboring satellite measurement outside the measurement gap, it may apply the scheduling restriction within a given/pre-defined time period. The time period may comprise the OFDM symbols overlapped with the SSBs of the neighboring satellite and X symbols before and/or after the SSBs. The X symbols can be one symbol as shown in FIG. 3. Thus, the UE shall not transmit/receive control and/or data on the OFDM symbols or slots/subframes with scheduling restriction. The serving satellite is also not expected to schedule UL/DL data within the time period (i.e., the serving satellite shall also apply the scheduling restriction within the time period). Outside the time period, the UE can transmit UL symbols or receive DL symbols on the symbols with scheduling availability (i.e., without scheduling restriction). The serving satellite is allowed to schedule UL/DL data outside the time period.

Figure 4:
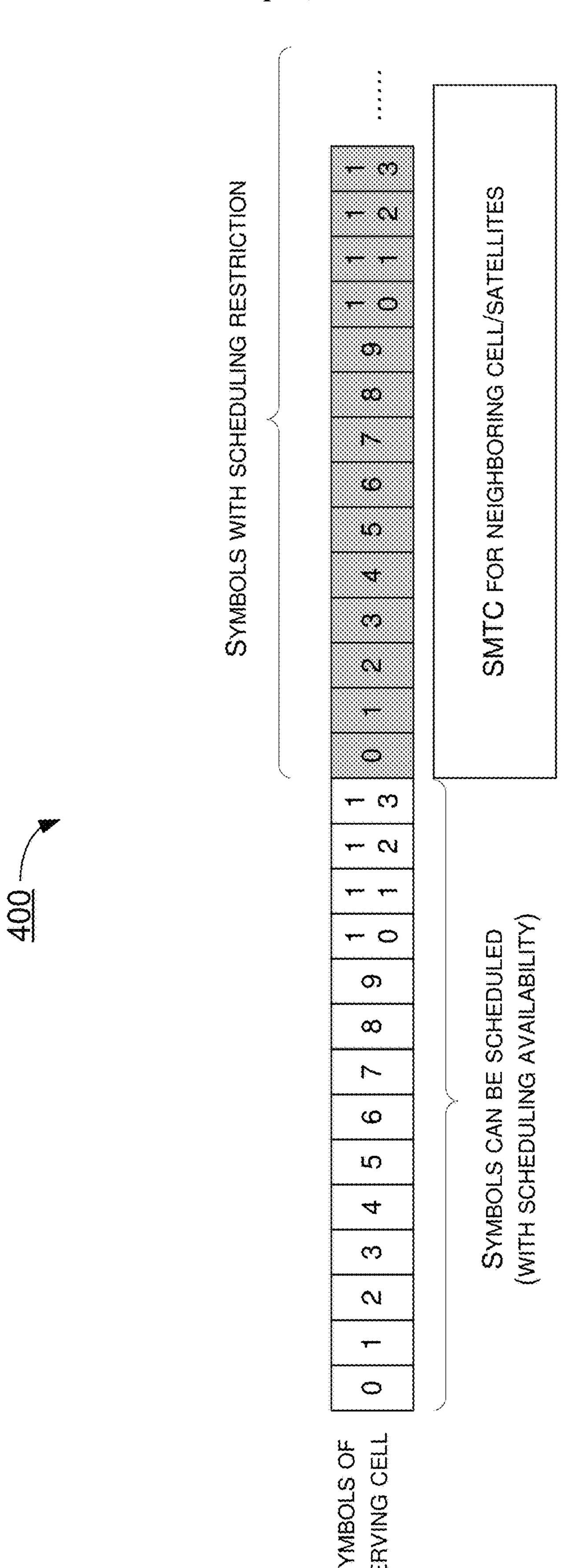
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves at least one UE and a plurality of network nodes (e.g., satellites), which may be a part of a wireless communication network (e.g., an LTE network, a 5G/NR network, an IoT network or a 6G network). Similarly, the UE needs to determine whether to perform a measurement outside the measurement gap for the neighboring satellite. The neighboring satellite measurement may be an intra-frequency measurement and an inter-frequency measurement without measurement gap. Once the UE determines that it needs to perform the neighboring satellite measurement outside the measurement gap, it may apply the scheduling restriction within a given/pre-defined time period. In scenario 400, the time period may comprise the SMTC window duration. The SMTC is associated to the neighboring satellites. Thus, the UE shall not transmit/receive control and/or data on the OFDM symbols or slots/subframes with scheduling restriction. The serving satellite is also not expected to schedule UL/DL data within the SMTC window (i.e., the serving satellite shall also apply the scheduling restriction within the SMTC window). Outside the SMTC window, the UE can transmit UL symbols or receive DL symbols on the symbols with scheduling availability (i.e., without scheduling restriction). The serving satellite is allowed to schedule UL/DL data outside the SMTC window.

In some implementations, the UE may apply the scheduling restriction in a case that timing difference between satellites is large. For example, when the parameter/indication deriveSSB-IndexFromCell is disabled. The parameter/indication deriveSSB-IndexFromCell may indicate whether the UE can utilize serving cell timing to derive the index of SSB transmitted by a neighbor cell. If this field is enabled (e.g., set to true), the UE may assume system frame number (SFN) and frame boundary alignment across cells on the serving frequency. If this field is disabled (e.g., set to false), the UE may assume that the timing difference between cells is large and apply the scheduling restriction within the time period.

Figure 5:
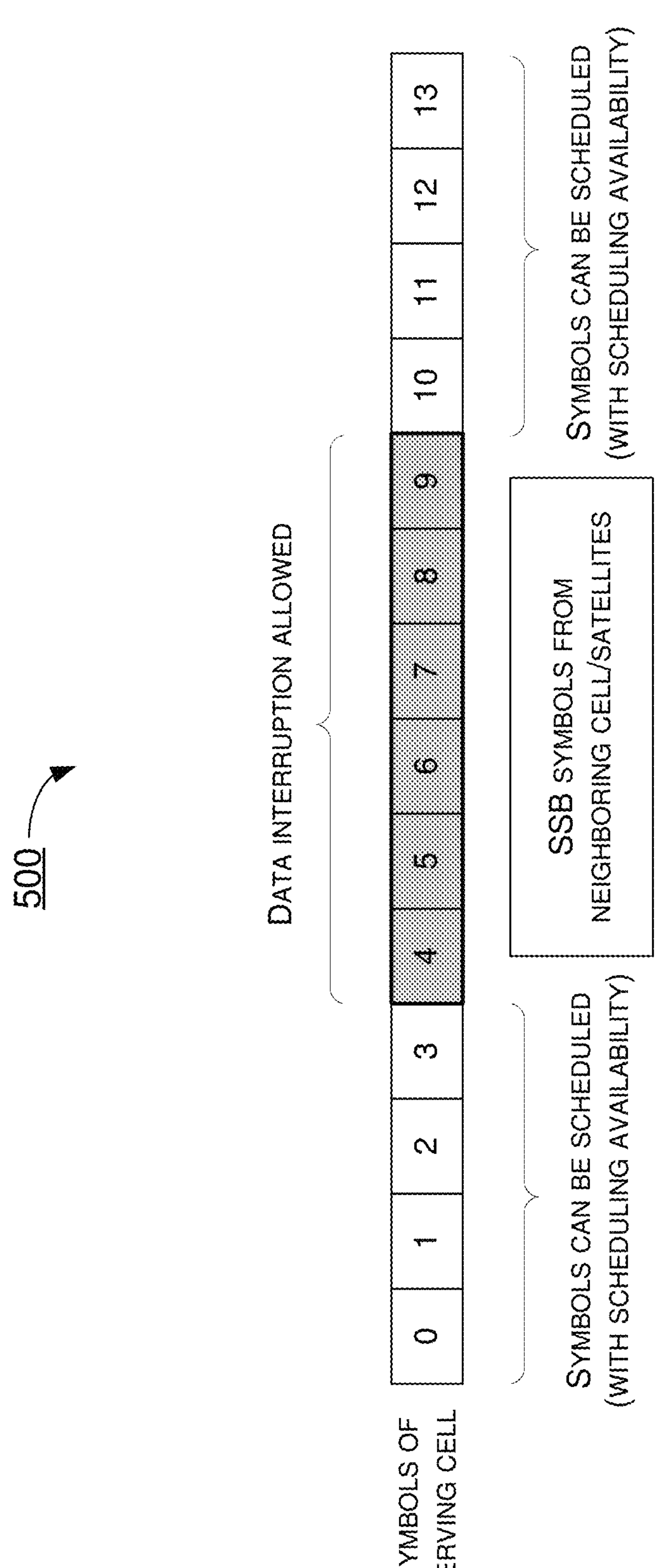
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves at least one UE and a plurality of network nodes (e.g., satellites), which may be a part of a wireless communication network (e.g., an LTE network, a 5G/NR network, an IoT network or a 6G network). Similarly, the UE needs to determine whether to perform a measurement outside the measurement gap for the neighboring satellite. The neighboring satellite measurement may be an intra-frequency measurement and an inter-frequency measurement without measurement gap. Once the UE determines that it needs to perform the neighboring satellite measurement outside the measurement gap, the data interruption is allowed within a given/pre-defined time period. The time period may comprise the OFDM symbols overlapped with the SSBs of the neighboring satellite and X symbols before and/or after the SSBs. The X symbols can be zero symbol as shown in FIG. 5.

For the data interruption, the UE shall not transmit/receive control and/or data on the OFDM symbols or slots/subframes with scheduling restriction. However, the serving satellite is allowed to schedule DL data within the time period (i.e., data transmission is allowed for the serving satellite within the time period). Specifically, the data interruption means that the serving satellite still can transmit data to the UE within the time period. But the serving satellite needs to accept that the transmitted data within the time period may not be received by the UE. This leaves some design tolerances for the network side. The serving satellite may not need to apply the scheduling restriction but has to accept that the scheduled data may be missed by the UE. The serving satellite may need to perform some retransmissions for the data interruption. Outside the time period, the UE can transmit UL symbols or receive DL symbols on the symbols with scheduling availability (i.e., without scheduling restriction). The serving satellite is allowed to schedule UL/DL data outside the time period.

ILLUSTRATIVE IMPLEMENTATIONS

Figure 6:
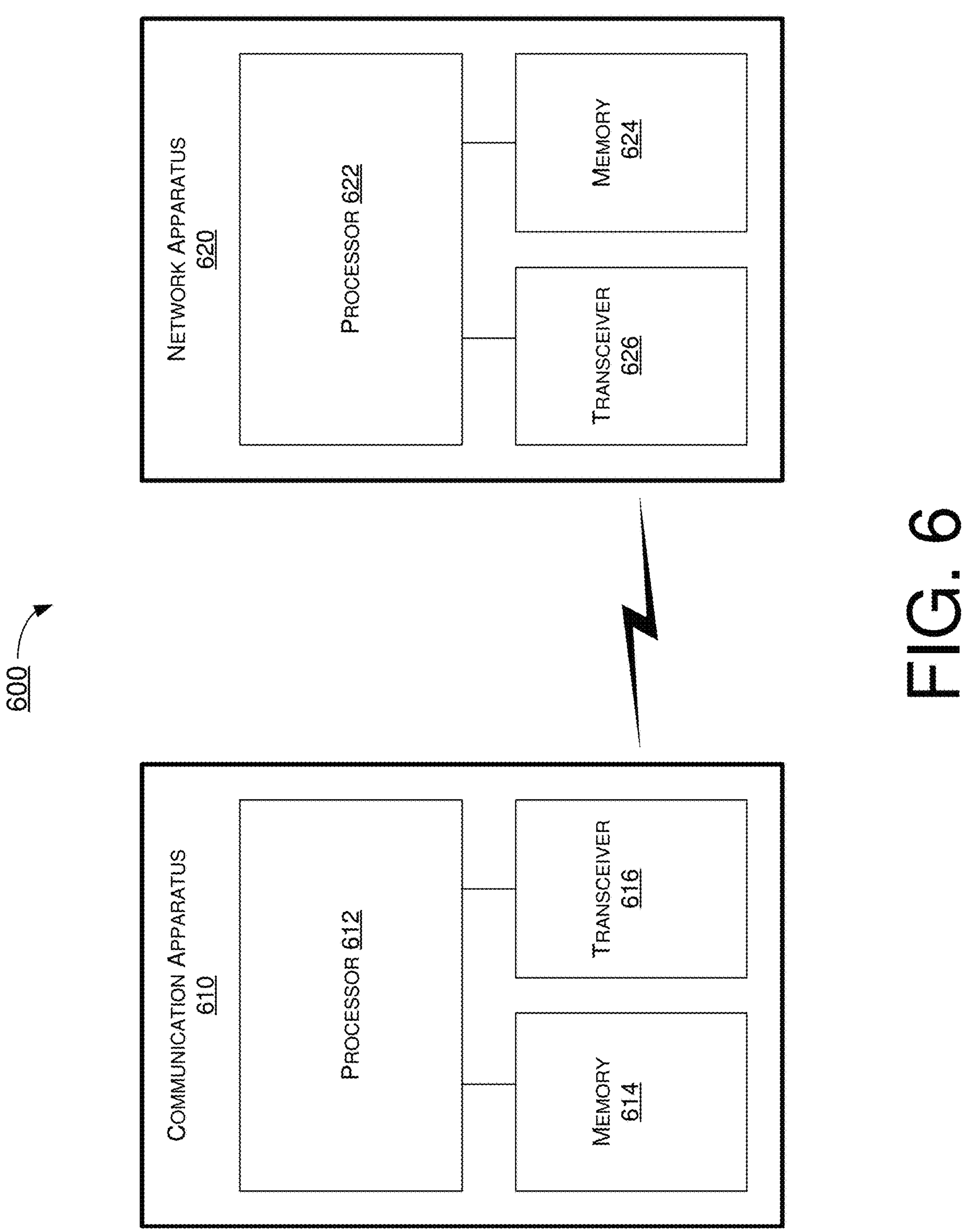
FIG. 6 is a block diagram of an example communication system in accordance with an implementation of the present disclosure.

FIG. 6 illustrates an example communication system 600 having an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to SAN or NTN measurement and data scheduling with respect to user equipment and network apparatus in mobile communications, including scenarios/schemes described above as well as process 700 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT, NB-IoT, or I IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of a network apparatus, which may be a network node such as a satellite, a base station, a small cell, a router or a gateway. For instance, network apparatus 620 may be implemented in an eNodeB in an LTE network, in a gNB in a 5G/NR, IoT, NB-IoT or IIoT network or in a satellite or base station in a 6G network. Alternatively, network apparatus 620 may be implemented in the form of one or more IC chips such as, for example and without limitation, one or more single-core processors, one or more multi-core processors, or one or more RISC or CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including autonomous reliability enhancements in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may determine whether to perform a measurement outside a measurement gap for a neighboring cell. Processor 612 may apply a scheduling restriction within a time period in an event that the measurement is determined. Processor 612 may cancel data transmission or data reception within the time period with the scheduling restriction. Processor 612 may transmit, via the transceiver 616, uplink symbols or receiving downlink symbols outside the time period with the scheduling restriction. The measurement may comprise at least one of an intra-frequency measurement and an inter-frequency measurement without measurement gap.

In some implementations, processor 612 may receive, via the transceiver 616, a first ephemeris of a serving cell and a second ephemeris of the neighboring cell. Processor 612 may determine that the serving cell and the neighboring cell are served by different satellites according to the first ephemeris and the second ephemeris.

In some implementations, network apparatus 620 may be a neighboring satellite or a neighboring network node of an SAN or NTN.

In some implementations, the time period may comprise a plurality of OFDM symbols, slots or subframes overlapped with a reference signal of network apparatus 620. The time period may further comprise a pre-determined number of symbols before and after the reference signal.

In some implementations, the time period may comprise an SMTC window associated to network apparatus 620.

In some implementations, a data interruption is allowed within the time period with the scheduling restriction for network apparatus 620 and communication apparatus 610.

In some implementations, processor 612 may perform the measurement in a first frequency band of network apparatus 620 different from a second frequency band of a serving cell.

ILLUSTRATIVE PROCESSES

Figure 7:
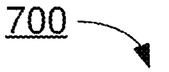
FIG. 7 is a flowchart of an example process in accordance with an implementation of the present disclosure.

FIG. 7 illustrates an example process 700 in accordance with an implementation of the present disclosure. Process 700 may be an example implementation of above scenarios/schemes, whether partially or completely, with respect to SAN or NTN measurement and data scheduling with the present disclosure. Process 700 may represent an aspect of implementation of features of communication apparatus 610. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks of process 700 may be executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of communication apparatus 610 determining whether to perform a measurement outside a measurement gap for a neighboring cell. Process 700 may proceed from 710 to 720.

At 720, process 700 may involve processor 612 applying a scheduling restriction within a time period in an event that the measurement is determined. Process 700 may proceed from 720 to 730.

At 730, process 700 may involve processor 612 transmitting uplink symbols or receiving downlink symbols outside the time period with the scheduling restriction.

In some implementations, process 700 may further involve processor 612 not transmitting uplink symbols or not receiving downlink symbols within the time period with the scheduling restriction.

In some implementations, process 700 may further involve processor 612 receiving a first ephemeris of a serving cell and a second ephemeris of the neighboring cell and determining that the serving cell and the neighboring cell are served by different satellites according to the first ephemeris and the second ephemeris.

In some implementations, process 700 may further involve processor 612 performing the measurement in a first frequency band of the neighboring cell different from a second frequency band of a serving cell.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

performing, by a processor of an apparatus, a measurement without a measurement gap for a neighboring cell when a serving cell and the neighbor cell are served by different satellites for mobility management;

applying, by the processor, a scheduling restriction within a time period in an event that the measurement is determined, wherein the scheduling restriction indicates that uplink symbols and downlink symbols are not transmitted or received within the time period, and the measurement for the neighbor cell is performed within the time period; and transmitting, by the processor, uplink symbols or receiving downlink symbols outside the time period with the scheduling restriction.

2. The method of claim 1, wherein the measurement comprises at least one of an intra-frequency measurement and an inter-frequency measurement without measurement gap.

3. The method of claim 1, wherein the time period comprises a plurality of orthogonal frequency division multiplexing (OFDM) symbols, slots or subframes overlapped with a reference signal of the neighboring cell.

4. The method of claim 3, wherein the time period further comprises a pre-determined number of symbols before and after the reference signal.

5. The method of claim 1, wherein the time period comprises an SSB-based radio resource management (RRM) measurement timing configuration (SMTC) window associated to the neighboring cell.

6. The method of claim 1, wherein a data interruption is allowed within the time period with the scheduling restriction, and the data interruption comprises that the serving cell is able to transmit data to the apparatus within the time period while the apparatus does not receive the data within the time period.

7. The method of claim 1, further comprising:

cancelling, by the processor, data transmission or data reception within the time period with the scheduling restriction.

8. The method of claim 1, further comprising:

determining, by the processor, that the serving cell and the neighboring cell are served by different satellites.

9. The method of claim 1, further comprising:

receiving, by the processor, a first ephemeris of a serving cell and a second ephemeris of the neighboring cell; and determining, by the processor, that the serving cell and the neighboring cell are served by different satellites according to the first ephemeris and the second ephemeris.

10. The method of claim 1, further comprising:

performing, by the processor, the measurement in a first frequency band of the neighboring cell different from a second frequency band of a serving cell.

11. An apparatus, comprising:

a transceiver which, during operation, wirelessly communicates with at least one network node of a wireless network; and a processor communicatively coupled to the transceiver such that, during operation, the processor performs operations comprising:

performing a measurement without a measurement gap for a neighboring cell when a serving cell and the neighbor cell are served by different satellites for mobility management;

applying a scheduling restriction within a time period in an event that the measurement is determined, wherein the scheduling restriction indicates that uplink symbols and downlink symbols are not transmitted or received within the time period, and the measurement for the neighbor cell is performed within the time period; and transmitting, via the transceiver, uplink symbols or receiving downlink symbols outside the time period with the scheduling restriction.

12. The apparatus of claim 11, wherein the measurement comprises at least one of an intra-frequency measurement and an inter-frequency measurement without measurement gap.

13. The apparatus of claim 11, wherein the time period comprises a plurality of orthogonal frequency division multiplexing (OFDM) symbols, slots or subframes overlapped with a reference signal of the neighboring cell.

14. The apparatus of claim 13, wherein the time period further comprises a pre-determined number of symbols before and after the reference signal.

15. The apparatus of claim 11, wherein the time period comprises an SSB-based radio resource management (RRM) measurement timing configuration (SMTC) window associated to the neighboring cell.

16. The apparatus of claim 11, wherein a data interruption is allowed within the time period with the scheduling restriction, and the data interruption comprises that the serving cell is able to transmit data to the apparatus within the time period while the apparatus does not receive the data within the time period.

17. The apparatus of claim 11, wherein, during operation, the processor further performs operations comprising:

cancelling data transmission or data reception within the time period with the scheduling restriction.

18. The apparatus of claim 11, wherein, during operation, the processor further performs operations comprising:

determining that the serving cell and the neighboring cell are served by different satellites.

19. The apparatus of claim 11, wherein, during operation, the processor further performs operations comprising:

receiving, via the transceiver, a first ephemeris of a serving cell and a second ephemeris of the neighboring cell; and determining that the serving cell and the neighboring cell are served by different satellites according to the first ephemeris and the second ephemeris.

20. The apparatus of claim 11, wherein, during operation, the processor further performs operations comprising:

performing the measurement in a first frequency band of the neighboring cell different from a second frequency band of a serving cell.

* * * * *